United States Patent [19]

Schuermann

[11] Patent Number: 5,500,651
[45] Date of Patent: Mar. 19, 1996

[54] SYSTEM AND METHOD FOR READING MULTIPLE RF-ID TRANSPONDERS

[75] Inventor: Josef Schuermann, Oberhummel, Germany

[73] Assignee: Texas Instruments Incorporated, Dallas, Tex.

[21] Appl. No.: 265,545

[22] Filed: Jun. 24, 1994

[51] Int. Cl.$^6$ ..................................................... G01S 13/75
[52] U.S. Cl. .................. 342/42; 342/44; 342/51
[58] Field of Search ................................. 342/51, 42, 44, 342/50

[56] References Cited

U.S. PATENT DOCUMENTS

| | | | |
|---|---|---|---|
| 3,870,994 | 3/1975 | McCormick et al. | 342/42 |
| 3,882,497 | 5/1975 | Klass et al. | 342/32 |
| 3,936,823 | 2/1976 | Weber | 342/97 |
| 3,969,616 | 7/1976 | Mimken | 342/49 X |
| 4,124,850 | 11/1978 | Frazier, Jr. et al. | 342/48 |
| 4,167,007 | 9/1979 | McGeoch et al. | 342/44 |
| 4,229,737 | 10/1980 | Heldwein et al. | 342/44 |
| 4,633,251 | 12/1986 | McGeoch et al. | 342/44 |
| 5,053,774 | 10/1991 | Schuermann et al. | 342/44 |
| 5,339,073 | 8/1994 | Dodd et al. | 340/825.31 |
| 5,367,303 | 11/1994 | Waltz | 342/37 |

*Primary Examiner*—John B. Sotomayor
*Attorney, Agent, or Firm*—Thomas G. Eschweiler; Ira S. Matsil; Richard L. Donaldson

[57] ABSTRACT

A system and method for communicating between an identification reader 12 and a transponder unit 10 is disclosed herein. A first interrogation signal is transmitted from the reader 12. This first interrogation signal having a first read range. A first response signal is then received at the reader 12 after which a second interrogation signal is transmitted from the reader 12. The second interrogation signal has a second read range which is different than said first read range. The read range can be varied by varying either the amplitude or duration of the power level of the interrogation signal. A second response signal is then received at the reader 12. These consecutive responses are then compared determine a correct response signal which can be displayed.

22 Claims, 3 Drawing Sheets

SYSTEM AND METHOD FOR READING MULTIPLE RF-ID TRANSPONDERS

CROSS-REFERENCE TO RELATED APPLICATIONS

The following co-assigned patent applications are hereby incorporated herein by reference:

| Pat. or Ser. No. | Filing Date | Issue Date | TI Case No. |
| --- | --- | --- | --- |
| 5,053,774 | 02/13/91 | 10/01/91 | TI-12797A |
| 07/981,635 | 11/25/92 | | TI-16688 |
| 08/076,036 | 06/15/93 | | TI-17226 |
| 08/054,506 | 04/27/93 | | TI-17510 |

FIELD OF THE INVENTION

This invention generally relates to identification systems and more specifically to a system and method for reading multiple RF-ID transponders.

BACKGROUND OF THE INVENTION

There is a great need for devices or apparatuses which make it possible to identify or detect objects in contactless manner and over a certain distance. In addition, a need exists to be able to change the data stored in, or operating characteristics of, these devices or apparatuses (e.g., "program" the devices or apparatuses).

It is, for example, desirable to contactlessly request, over a certain distance, identifications which are uniquely assigned to an object. These identifications could be stored in the device or apparatus so that, for example, the object may be identified. A determination may also be made as to whether or not a particular object exists within a given reading range.

As another example, physical parameters such as temperature or pressure can be interrogated directly even when direct contact to the object is not possible. A device or apparatus of the type desired can, for example, be attached to an animal which can then always be identified at an interrogation point without direct contact.

There is also a need for a device which, when carried by a person, permits access checking whereby only persons whose responder unit returns certain identification data to the interrogation unit are allowed access to a specific area. In this case the safeguarding of the data transfer is a very essential factor in the production of such devices.

A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom.

SUMMARY OF THE INVENTION

Several transponder arrangements have been developed. One such transponder arrangement is described in U.S. Pat. No. 5,053,774 issued to Schuermann et al. on Oct. 1, 1991, incorporated herein by reference. This patent describes a transponder unit which has a low energy requirement and does not need its own power source. Another transponder arrangement is disclosed by Meier et al. in co-pending Ser. No. 07/981,635, also incorporated herein by reference. In this application, another transponder arrangement which may be updated in a contactless manner subsequent to its manufacture is described.

A problem arises when multiple non-line-of-sight transponders are disposed near to one another. Since there is no line-of-sight requirement before a transponder to be read, several transponders which are near to one another may each respond to a single interrogation signal. The interrogation unit must then distinguish between the possible multiple return signals which may interfere and associate the identification number with the object's position.

The solution of this problem, as well as other advantages, are accomplished by the present invention which provides a low cost system and method for reading multiple RF-ID transponders without the need for any particular transponder "anti-collision" protocol.

A system and method for communicating between an identification reader and a transponder unit is disclosed herein. A first interrogation signal is transmitted from the reader. This first interrogation signal has a first read range. The reader then receives first response signal and transmits a second interrogation signal. The second interrogation signal has a second read range which is different than the first read range. The read range can be varied by varying either the amplitude or duration of the power level of the interrogation signal. A second (or third or fourth etc.) response signal is then received at the reader. These responses are compared to determine a correct response signal which can be displayed. In this manner, a correct response from the strongest transponder can be obtained and incorrect indications which can result from multiple simultaneous responses avoided. It is assumed that the reader distance relative to the transponder moves during the interrogation and the interrogation cycles are short compared to the moving speed of the reader (which may be a hand held reader or in a fixed position where the reader is stationary and the object moves as in baggage on a conveyor belt).

In addition, the reader can measure and associate the strength of the signal from the transponder to the data received from subsequent signals to determine the transponder(s) to be identified, e.g., with majority voting/validating algorithms.

The present invention has a number of advantages. Prior art systems often must touch the identification unit to be read. This creates a great inconvenience, especially if the items are arranged in an arbitrary pile or even if they are stacked. Other systems, such as bar codes, require a line-of-sight reading. In the system of the present invention, on the other hand, there is no requirement that the transponder be visible to the interrogation unit. In fact, in some products which are to be tracked, the transponder can be embedded in the actual product. An example of this embodiment relating to tires is described in co-pending application Ser. No. 08/054,506 ('506), incorporated herein by reference.

The present invention also provides for the identification of individual but adjacent transponders. One example relating to the co-pending '506 application is stacked tires. In other words, the present invention can be utilized to read each of the identification codes attached to each tire in a stack of fires. Of course, the present invention can also be used with other products such as baggage, laundry as well as in many other identification applications.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The following is a description of a system and method of the present invention. A simplified example of one system will first be described. A preferred embodiment will then be described in the context of an application where each transponder is embedded in a tire (although many other applications can also utilize the invention).

The present invention can be utilized with a number of identification systems. A simplified example of just one of these systems will be described with respect to FIG. 1. The details of the electronics of one such system are described in U.S. Pat. No. 5,053,774 (issued Oct. 1, 1991) and incorporated herein by reference. Another transponder arrangement is disclosed in co-pending Ser. No. 07/981,635, also incorporated herein by reference. Although the basic system may be known, the method of using the system is novel, and the known system can be modified to facilitate the present invention as will be described herein.

Figure 1:
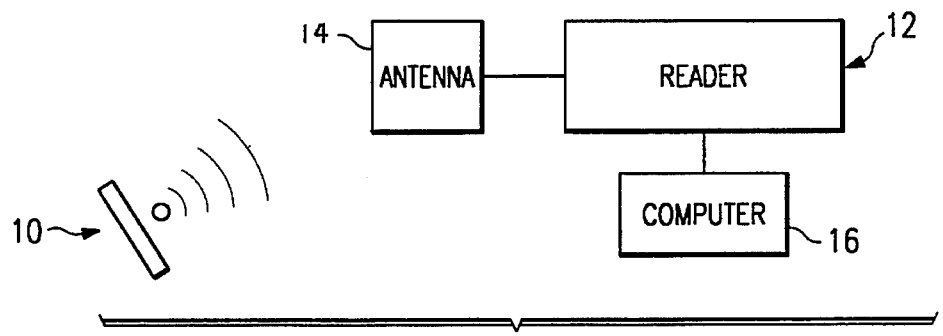
FIG. 1 illustrates a block diagram of an identification system.

Referring now to FIG. 1, a transponder 10 is provided. The transponder 10 can be attached to or embedded in an object (not shown). This object can be almost anything imaginable including a tire, baggage, laundry, a trash container, a vehicle, a security badge, or even a living animal. Information stored in the transponder can be accessed by a reader (or interrogation unit) 12. A reader antenna 14 and optionally to a computer 16 are coupled to the reader 12.

To interrogate the transponder 10, the reader 12 sends out a power burst to the transponder 10 via the antenna 14. In one application, the power burst charges up the passive (e.g., battery free) transponder in about 50 milliseconds. The transponder 10 returns a signal that carries the data that is stored within it. In the case of a read only transponder the data is a unique programmed bit code. In read/write applications, the data comprises the contents of a memory included within the transponder 10. Accordingly, the present invention can be used in a half duplex system. In a typical application, the entire read cycle can be performed in about 70 milliseconds. The data collected from the transponder 10 can either be sent directly to a computer 16 (e.g., through standard interfaces), or it can be stored in a portable reader and later uploaded to a computer or other system.

Figure 2:
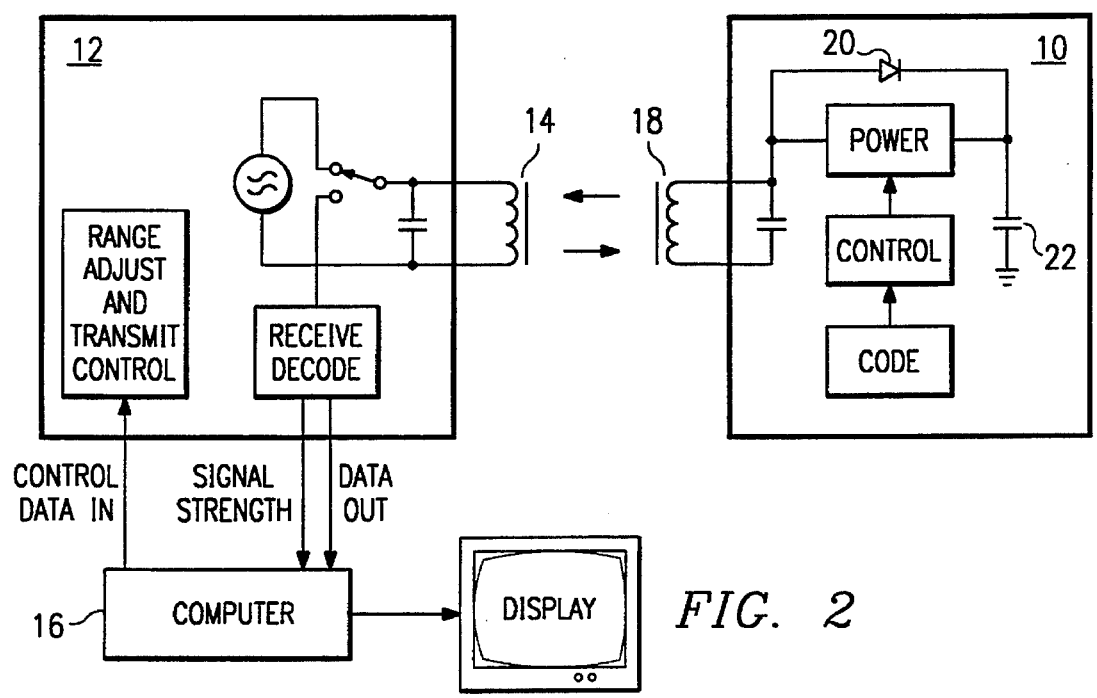
FIG. 2 illustrates a schematic diagram of an example of the system of FIG. 1.
Figure 3:
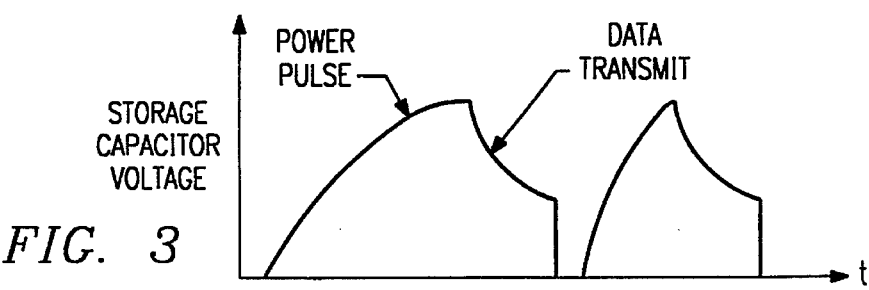
FIG. 3 illustrates a storage capacitor voltage during an interrogation cycle.
Figure 4:
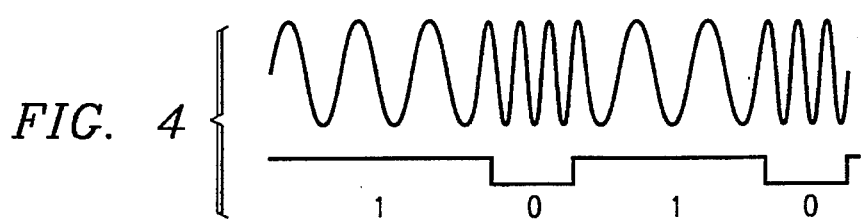
FIG. 4 illustrates a diagram of the signal levels for an frequency shift keyed signal.

The operation of an exemplary system will be described with reference to FIGS. 2–4. Reference should first be made to FIG. 2. When the transponder 10 is to be read, the reader 12 sends out a power pulse to the reader antenna 14. A portion of the field generated is "collected" by the transponder antenna 18 coupled to transponder 10. The antennas 14 and 18 are tuned to the same frequency. This collected AC energy is rectified (e.g., by diode 20) and then stored in a capacitor 22 within the transponder 10. When the power pulse has finished, the transponder 10 immediately transmits back its data code, using the energy stored within its capacitor 22 as the power source.

This data is picked up by the reader antenna 14 and decoded by the reader 12. Once all data has been sent, the storage capacitor 22 can be discharged thereby resetting the transponder 10 to make it ready for the next read cycle. The period between transmission pulses can be referred to as the "sync time" and will last as long as the system set up. The timing of the storage capacitor voltage is illustrated in FIG. 3. FIG. 3 illustrates two transmitted signals each of which has a different duration from the power pulse. Varying the duration of the power pulse will advantageously vary the read range and the interrogation speed as discussed below.

In the preferred embodiment, the transmission technique used between the transponder 10 and the reader 12 is frequency shift keying (FSK). An FSK signal is illustrated in FIG. 4. This approach has comparatively good resistance to noise while also being very cost effective to implement. It should be noted, however, the system of the present invention is not restricted to FM systems or systems operating in sequential power/read modes. It can also be applied to parallel or full duplex systems if power level reduction techniques are being used.

Although the present invention can be utilized with any number of systems, the identification system described herein overcomes some of the limitations of other systems because it does not require line-of-sight between the transponder and the reader. This means that the system can work effectively in environments with excessive dirt, dust, moisture, and poor visibility. In addition, because it can be designed to work at relatively low frequencies, the system can also work through most nonmetallic materials.

The method and system of the present invention are most useful when used with applications with multiple non-line-of-sight transponders which are disposed near to one another. Since there is no line-of-sight requirement for a transponder to be read, several transponders which are near to one another may each respond to a single interrogation signal. The interrogation unit must then distinguish between the possible multiple return signals which may interfere.

The preferred embodiment of the present invention will now be described in the context of an application where each transponder is embedded in a tire. Although described in the context of tires, the present invention will work equally as well in a large number of applications. This particular application has only been chosen to simplify the illustration of a more general principle.

Figure 5:
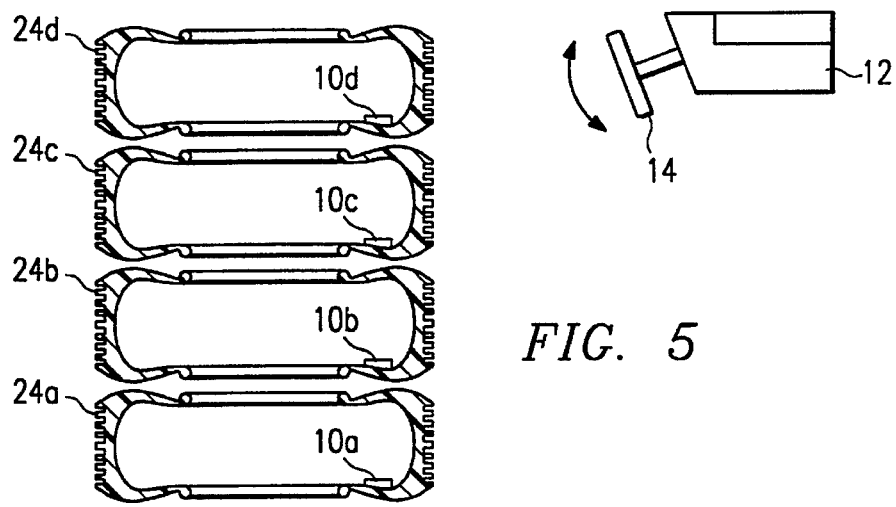
FIG. 5 illustrates an exemplary application for the use of the method and system of the present invention.

Referring now to FIG. 5, a reader 12 and plurality of transponders 10a–10d are illustrated. Each of the transponders 10a–10d is embedded in a respective tire 24a–24d. As described above, each of the transponders 10a–10d stores an identification code which is to be supplied to the reader 12 in response to an interrogation pulse. One method of incorporating a transponder in a tire is described in co-pending application Ser. No. 08/054,506.

In this embodiment, the reader 12 is preferably a hand held interrogation unit (HHU). In other words, the reader 12 can move while the transponders either move or remain still. In the illustrative embodiment, the tires 24a–d are stacked or otherwise piled while an individual moves the reader 12 near the pile.

In other applications, the reader 12 is stationary and the transponders 10a–d are moved back and forth in the vicinity of the reader 12. It is not critical whether the transponders 10a–d or the reader 12 are moved so long as the distance between them is varied.

In another embodiment, the position of neither the transponder nor the reader is changed, but the reader reads by changing the read range. This embodiment is less preferred because the closest transponder may still dominate all responses.

Figure 6:
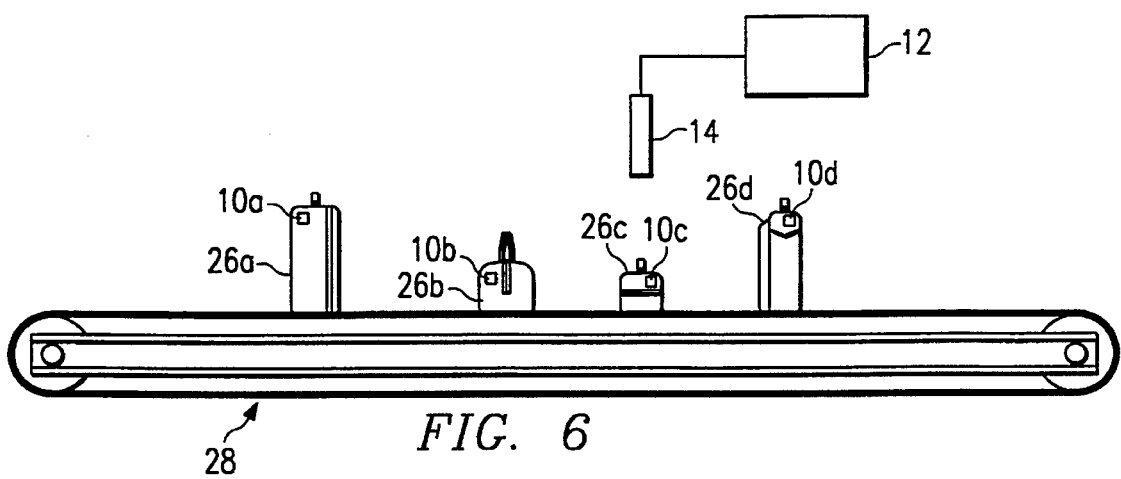
FIG. 6 illustrates a second exemplary application where the method and system are used to identify baggage.
Figure 7:
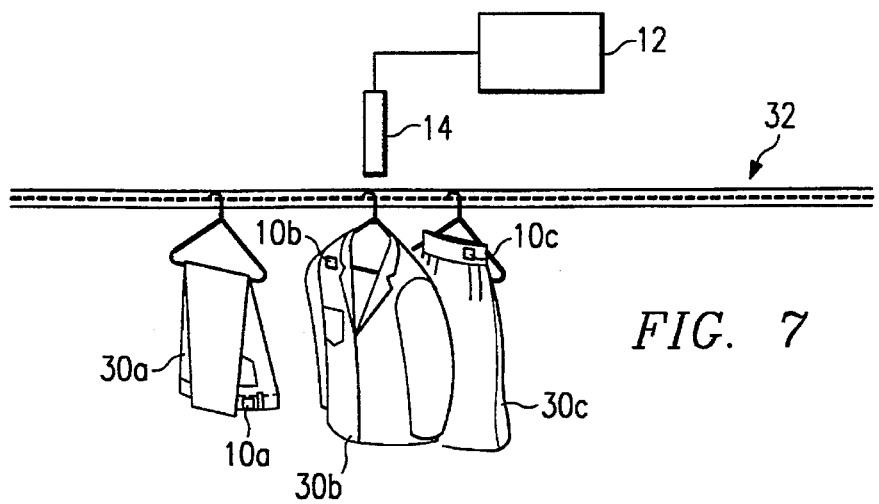
FIG. 7 illustrates a third exemplary application where the method and system are used to identify laundry.

As noted above, the present invention can be utilized with a number of applications besides tires. FIGS. 6 and 7 illustrate two of these applications. FIG. 6 illustrates an application where transponders 10a–d are used to track luggage 26a–d, for example in an airport. Each of the transponders 10a–d is disposed near one of the pieces of luggage 26a–d which are illustrated on a conveyor belt 28. The luggage 26a–d passes near reader antenna 14 which is coupled to reader 12.

FIG. 7 illustrates an application where each of the transponders 10a–c is associated with a piece of laundry 30a–c. The transponders 10a–c can be attached, for example, to shirt collars and pant waistbands under a heat-sealed garment label. The garments 30a–30c are illustrated on a rack 32 (which can be a conveyor or a stationary rack). The transponders 30a–30c can be read at any one of the laundry process steps by reader 12 through antenna 14.

Although only three embodiments have been illustrated, it should be understood that the present invention can be utilized with many other applications.

Figure 8:
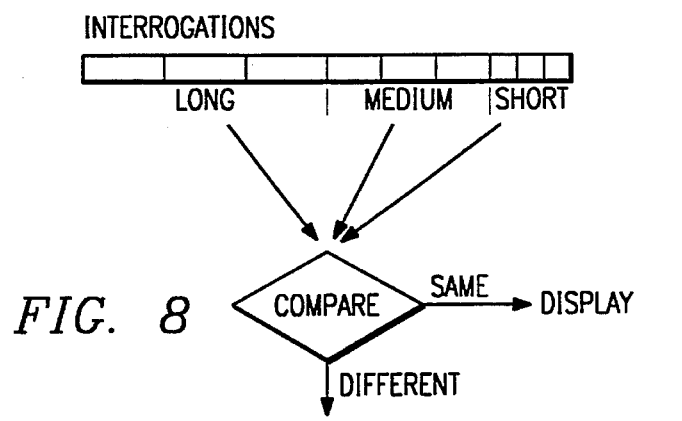
FIG. 8 illustrates a block diagram of a method of the present invention.
Figure 9:
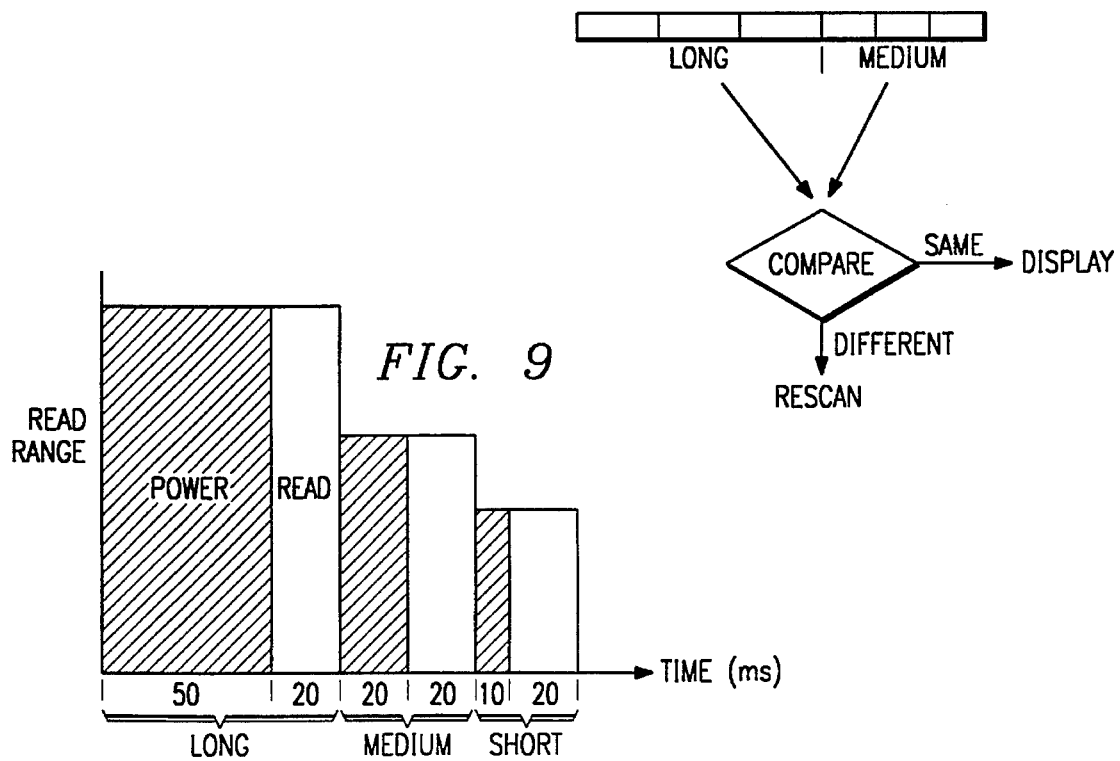
FIG. 9 illustrates a series of signals with varying read ranges.

A novel method of reading each of the transponders will now be described with reference to FIGS. 8 and 9 as well as FIG. 5. The reader 12 is moved so that it can read each of the transponders 10 in the stack of tires 24a–d. When two transponders are both in field (i.e., within range to be read by reader 12), both will return a signal. If one of these signals is slightly stronger, the reader 12 will read the dominating signal and will suppress the slightly weaker signal. A ratio of only a few decibels (dB) between the two signals will suffice. This fact demonstrates one of the advantages an FSK system has over an ASK (amplitude shift keying) system where a 20–30 dB difference is normally required to differentiate signals.

The reader starts with a low number of interrogations at medium or large reading range followed by a series of shorter range interrogations. An interrogation is the act of transmitting an interrogation signal to effect a response from a transponder 10. The read range is a measure of how far apart the transponder 10 and the reader 12 may be and still be able to communicate. The read range can be increased by increasing the duration of the power pulse (see FIG. 3). An example of three input pulses with varying read ranges is illustrated in FIG. 9. In this example, the duration of the power pulse is varied between 50 msec, 20 msec and 10 msec. In each case, a time 20 msec is allocated for the data transmit (see FIG. 3). In other words, in this example, a high range interrogation signal is transmitted from the interrogation unit 12. The interrogation unit 12 receives a first response signal and then transmits a medium range interrogation signal. A second response signal is then received at the reader 12. Of course, these response signals have been generated by one of the transponders 10.

A long range interrogation signal with a duration of 50 msec may typically provide a read range on the order of 0.5 meters. In this same system, a medium range interrogation signal with a duration of 20 msec may typically provide a read range on the order of 0.3 meters and a short range interrogation signal with a duration of 10 msec may typically provide a read range on the order of 0.15 meters. It should be understood, however, these read ranges are provided strictly as examples and will vary depending upon the system and the application.

Alternatively, the read range can be increased by increasing the power transmitted by the reader. In typical embodiments, the H-field excitation or power level will be varied between about 68 and 130 dBµA/m (referenced to a measurement distance of one meter). Combinations of varying duration and power can also be utilized.

The reader 12 may transmit one or more of each read range signal before beginning transmission of a different range signal. In the preferred embodiment, the sequence for transmitting signals comprises transmitting about 2–3 long range signals, followed by about 1–4 medium range signals, and then followed by about 1–6 short range signals. This sequence is preferably repeated about 2–4 times.

Returning to FIG. 8, the results from the data received from the long, medium and short range pulses are compared. If unanimous reading results are obtained, the chances are very high the read was successful and the data is displayed in a timely fashion when the reader passes the location or position of the object to be determined. If, however, the results are not unanimous but the high and medium range results are consistent, the number can also be displayed. If a higher degree of accuracy is required, the transponders can be rescanned.

If the medium range result is inconsistent, successively shorter ranges at higher interrogation speed are triggered. If these results are consistent, the results are displayed. If, however, the results are inconsistent, a message can be displayed asking the operator of the reader to scan again to confirm the indicated result. In an automatic moving identification environment, the reader 12 (or a conveyor belt 28 as in FIG. 6 or a pallet car which is not shown) can be moved back and forth.

As the reader 12 is moved near the pile of tires 24a–d, each transponder 10 will be read many times. The system described herein will vary the read range and the operator can vary the distance between the reader 12 and the transponders 10. This act of moving the reader and the algorithm of varying the power will combine to maximize the chance of obtaining a correct reading.

The present invention can be utilized in applications which do more than simply identify an object. One of these other advantageous embodiments is utilized with transponders having Read/Write capability. A certain sequence or other data can be written into the transponder. This data can then be used to identify specific components or objects at a later time or in different regrouped configurations. In other words, the present invention can be used in a half duplex system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating between an identification reader and a transponder unit, said method comprising the steps of:

transmitting a first interrogation signal from said reader, said first interrogation signal having a first read range;

receiving a first response signal at said reader;

transmitting a second interrogation signal from said reader, said second interrogation signal having a second read range which is different than said first read range;

receiving a second response signal at said reader; and comparing said first response signal to said second response signal to determine a correct response signal.

2. The method of claim 1 and further comprising the step of varying the distance between the reader and the transponder unit.

3. The method of claim 1 and further comprising the step of displaying an output based upon said correct response if said first and second response signals match.

4. The method of claim 1 wherein said steps of transmitting a first interrogation signal, receiving a first response signal, transmitting a second interrogation signal, receiving a second response signal, and comparing said first and second response signals are repeated if said first and second response signals do not match.

5. The method of claim 1 and further comprising the steps off:

transmitting a third interrogation signal from said reader, said third interrogation signal having a third read range;

receiving a third response signal at said reader; and comparing said third response signal to said first and second response signals to determine a correct response signal.

6. The method of claim 5 wherein:

said step of transmitting a first interrogation signal comprises transmitting said first interrogation signal two to three times;

said step of transmitting a second interrogation signal comprises transmitting said second interrogation signal one to four times; and said step of transmitting a first interrogation signal comprises transmitting said first interrogation signal one to six times.

7. The method of claim 1 wherein said first interrogation signal has a first duration and said second interrogation signal has a second duration different than said first duration.

8. The method of claim 7 wherein said first duration is longer than said second duration.

9. The method of claim 1 wherein said first interrogation signal has a first power level and said second interrogation signal has a second power level different than said first duration.

10. The method of claim 1 where said first interrogation signal has a duration of about 50 msec.

11. The method of claim 1 where said first interrogation signal has a duration of about 20 msec.

12. The method of claim 1 where said first interrogation signal has a duration of about 10msec.

13. The method of claim 1 wherein said first read range is higher than said second read range and said first interrogation signal is transmitted before the second interrogation signal.

14. The method of claim 1 wherein said step of transmitting a first interrogation signal comprises transmitting more than one interrogation signal.

15. The method of claim 1 wherein said reader comprises a hand held interrogation unit.

16. The method of claim 1 wherein said first and second interrogation signals comprise FSK signals.

17. A method for identifying each object within a plurality of objects, said method comprising:

providing a plurality of transponders;

associating one of said transponders with each object such that each of said transponders is disposed near one of said objects;

directing a first interrogation signal toward at least two of said plurality of objects, said first interrogation signal having a first read range;

transmitting a first response signal from at least one of said transponders in response to said first interrogation signal;

receiving said first response signal at a reader;

transmitting a second interrogation signal from said reader, said second interrogation signal having a second read range which is different than said first read range;

directing a second interrogation signal toward at least two of said plurality of objects, said second interrogation signal having a second read range;

transmitting a second response signal from at least one transponders in response to said second interrogation signal;

receiving said second response signal at said reader; and comparing said first response signal to said second response signal to determine a correct response signal.

18. The method of claim 17 wherein said first interrogation signal has a first duration and said second interrogation signal has a second duration different than said first duration.

19. The method of claim 17 wherein said objects comprise tires.

20. The method of claim 17 wherein said steps of directing, transmitting and receiving signals are performed in a half duplex system.

21. The method of claim 20 wherein said response signals comprise FSK signals.

22. The method of claim 17 wherein said steps of directing, transmitting and receiving signals are performed in a full duplex system.

* * * * *